United States Patent
Nefcy et al.

(10) Patent No.: US 9,598,085 B2
(45) Date of Patent: Mar. 21, 2017

(54) REGENERATIVE-BRAKING TRANSMISSION DOWNSHIFT TORQUE LIMITING

(71) Applicant: FORD GLOBAL TECHNOLOGIES, LLC, Dearborn, MI (US)

(72) Inventors: Bernard D. Nefcy, Novi, MI (US); Mark Steven Yamazaki, Canton, MI (US); Yanan Zhao, Ann Arbor, MI (US); Scott J. Lauffer, Northville, MI (US); Francis Thomas Connolly, Ann Arbor, MI (US); Zhengyu Dai, Canton, MI (US); Matthew John Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 14/302,460

(22) Filed: Jun. 12, 2014

(65) Prior Publication Data
US 2015/0360691 A1     Dec. 17, 2015

(51) Int. Cl.
| | |
|---|---|
| *B60W 30/18* | (2012.01) |
| *B60W 20/00* | (2016.01) |
| *B60W 10/10* | (2012.01) |
| *B60W 10/08* | (2006.01) |
| *B60K 6/387* | (2007.10) |
| *B60K 6/547* | (2007.10) |
| *B60W 10/06* | (2006.01) |

(Continued)

(52) U.S. Cl.
CPC ....... *B60W 30/18127* (2013.01); *B60K 6/387* (2013.01); *B60K 6/547* (2013.01); *B60W 10/06* (2013.01); *B60W 10/08* (2013.01); *B60W 10/115* (2013.01); *B60W 10/184* (2013.01); *B60W 20/14* (2016.01); *B60W 20/30* (2013.01); *B60K 2006/4825* (2013.01); *B60W 2510/101* (2013.01); *B60W 2510/1005* (2013.01); *B60W 2710/083* (2013.01); *B60W 2710/1005* (2013.01); *B60W 2710/182* (2013.01); *B60Y 2300/89* (2013.01); *Y10S 903/93* (2013.01)

(58) Field of Classification Search
CPC ........... B60K 6/365; B60K 6/445; B60K 6/44
USPC .................. 701/70, 22; 180/65.27; 903/947; 477/109, 167, 3, 4, 5
See application file for complete search history.

(56) References Cited

U.S. PATENT DOCUMENTS

| | | | | |
|---|---|---|---|---|
| 4,270,806 A | * | 6/1981 | Venkataperumal ... | B60T 13/586 188/159 |
| 6,811,229 B2 | * | 11/2004 | Soga ........................ | B60K 6/44 188/156 |

(Continued)

*Primary Examiner* — Thomas G Black
*Assistant Examiner* — Wae Louie
(74) *Attorney, Agent, or Firm* — David B. Kelley; Brooks Kushman P.C.

(57) ABSTRACT

A hybrid vehicle powertrain is configured to provide a regenerative-braking torque limit on a transmission during a regenerative-braking downshift. The regenerative-braking downshift event has sequential boost, start, torque, inertia, and end phases. The transmission may be operated in absence of a regenerative-braking torque limit during the boost and start phases to recapture more energy. The transmission may be operated with a regenerative-braking torque limit during the torque and inertia phases to protect for an input shaft speed dip that may occur without the limit. The limit may be removed once the regenerative-braking downshift event is completed.

16 Claims, 2 Drawing Sheets

(51) Int. Cl.
*B60W 10/115* (2012.01)
*B60W 10/184* (2012.01)
*B60W 20/30* (2016.01)
*B60W 20/14* (2016.01)
*B60K 6/48* (2007.10)

(56) References Cited

U.S. PATENT DOCUMENTS

| | | | | |
|---|---|---|---|---|
| 6,890,283 | B2* | 5/2005 | Aoki | B60K 6/44 |
| | | | | 477/5 |
| 8,066,616 | B2* | 11/2011 | Minamikawa | B60W 30/18136 |
| | | | | 180/65.265 |
| 8,135,526 | B2* | 3/2012 | Minarcin | B60K 6/365 |
| | | | | 180/65.285 |
| 8,155,814 | B2* | 4/2012 | Tamai | B60W 20/11 |
| | | | | 477/181 |
| 2013/0109531 | A1* | 5/2013 | Hoshiba | B60W 10/06 |
| | | | | 477/52 |
| 2013/0238208 | A1* | 9/2013 | Hirata | B60K 6/48 |
| | | | | 701/70 |
| 2013/0296100 | A1* | 11/2013 | Nefcy | B60W 10/08 |
| | | | | 477/4 |
| 2014/0080648 | A1* | 3/2014 | Kimes | B60K 6/543 |
| | | | | 475/5 |
| 2015/0038296 | A1* | 2/2015 | Toyota | B60W 20/00 |
| | | | | 477/92 |
| 2015/0197242 | A1* | 7/2015 | Yamazaki | B60W 20/30 |
| | | | | 701/22 |
| 2015/0202964 | A1* | 7/2015 | Nefcy | B60L 7/18 |
| | | | | 701/70 |
| 2015/0203106 | A1* | 7/2015 | Zhao | B60L 7/18 |
| | | | | 701/22 |

* cited by examiner

REGENERATIVE-BRAKING TRANSMISSION DOWNSHIFT TORQUE LIMITING

TECHNICAL FIELD

This disclosure relates to controlling regenerative-braking torque in a hybrid vehicle powertrain during a ratio change of the transmission that occurs during regenerative-braking.

BACKGROUND

Hybrid vehicles are vehicles with two or more power sources in a drivetrain. The most common automotive hybrid being a gasoline-electric hybrid, having an internal combustion engine and an electric motor/generator. Typically hybrid vehicles use both an engine and a motor to improve fuel consumption, emission, and performance by switching between the two at optimal times when either the engine or the motor may be more efficient than the other, or in a combination of the two when it is more efficient than the use of only one, depending on the hybrid system and vehicle mode.

Hybrid vehicles are generally classified by the division of power between sources; both sources may operate in parallel to simultaneously provide torque to the powertrain or they may operate in series with one source exclusively providing the torque and the second being used to augment the first's power reserve.

Hybrid vehicles may also incorporate an automatic transmission in the driveline between one or more of the sources and the drive wheels. An automatic transmission, also called an automatic gearbox, can automatically shift to different gear ratios as the vehicle starts to move, freeing the driver from having to shift gears manually. Most automatic transmissions have a defined set of gear ranges, and are referred to as a step-ratio automatic transmission.

During a process referred to as regenerative-braking, the motor is turned by the powertrain to charge a high-voltage battery. The motor provides vehicle deceleration by removing torque from the powertrain and transferring it into electric energy for storage in the battery. During regenerative-braking, driver torque demand may be provided solely by regenerative-braking or supplemented by frictional-braking. The apportionment of driver torque demand between frictional-braking torque and regenerative-braking torque (i.e., negative input torque via the motor) is balanced through the braking process to achieve as much regeneration as possible so that the energy may later be used to propel the vehicle and thereby improve fuel economy.

During regenerative-braking, it may be advantageous to downshift the transmission to increase the speed of the motor allowing for the motor to provide a greater negative torque input into the powertrain and provide for an increase in battery charging. However, the torque transfer through the transmission during a regenerative-braking downshift may need to be controlled to reduce shift shock. An example of a control strategy to reduce shift shock during a regenerative-braking downshift may be found in United States Patent Application US 2013/0296100, which is hereby incorporated by reference.

SUMMARY

One aspect of this disclosure is directed to a vehicle powertrain having a controller in communication with an electric machine, a frictional-braking system, and a transmission. The electric machine provides a regenerative-braking torque on the powertrain. The frictional-braking system provides a frictional-braking torque on the powertrain. The transmission is coupled to the powertrain and provides a regenerative-braking downshift to increase the amount of energy recapture during regenerative-braking by exchanging engagement of an offgoing clutch and an oncoming clutch over a series of phases. In this powertrain, the controller is programmed to, in response to an increase in driver braking torque demand during the regenerative-braking downshift, satisfy the increase in driver braking torque demand with regenerative-braking torque prior to the offgoing clutch disengaging and with frictional-braking torque after the offgoing clutch begins disengaging.

The controller may be further programmed to steadily increase the regenerative-braking torque, while reducing the frictional-braking torque, to satisfy the increase in driver braking torque demand during the regenerative-braking downshift as the oncoming clutch increases in engagement.

The controller, at an onset of the regenerative-braking downshift, may be further programmed to set the offgoing clutch at an initial engagement, based on a wheel torque limit, initiating a boost phase. As well, the controller may be programmed to maintain the offgoing clutch at a substantially constant engagement throughout the boost phase. The controller may also be programmed to hinder engagement of the oncoming clutch throughout the boost phase.

The controller may be further programmed to stroke the oncoming clutch while hindering disengagement of the offgoing clutch defining a start phase. As well, the controller may be programmed to increase engagement of the oncoming clutch while hindering disengagement of the offgoing clutch throughout the start phase.

The controller may be further programmed to begin decreasing the engagement of the offgoing clutch, initiating a torque phase, while continuing to increase the engagement of the oncoming clutch. A rotational speed of the powertrain will increase due to the exchanging of engagement of the offgoing clutch with the oncoming clutch which initiates an inertia phase. The controller may also be programmed to continue decreasing the engagement of the offgoing clutch while continuing to increase the engagement of the oncoming clutch. When the oncoming clutch becomes fully engaged and the offgoing clutch becomes fully disengaged, the controller may be further programmed to satisfy the increase in driver braking torque demand solely with regenerative-braking torque once again.

According to another aspect of this disclosure a regenerative-braking downshift method is disclosed. In this method a boost phase is initiated by setting an offgoing clutch engagement to hold a driver torque demand. The boost phase is ended by the initiating a start phase by stroking and engaging an oncoming clutch. The satisfying of any increase in driver torque demand during the boost and start phases is accomplished by increasing a regenerative-braking torque. The start phase is ended by the initiating of a torque phase by disengaging an offgoing clutch. The satisfying of any increase in driver torque demand during the torque phase is now accomplished by increasing a frictional-braking torque.

In this method, a level of engagement of the offgoing clutch sufficient to hold a driver torque demand may be based on a wheel torque limit. This method may also include decreasing the frictional-braking torque to satisfy the increase on driver torque demand during the torque phase by increasing the regenerative-braking torque at a controlled rate. In this method, when a rotational speed of the powertrain increases, due to the exchanging of engagement of the offgoing clutch with the oncoming clutch, the torque phase is ended and an inertia phase is initiated. Then during the inertia phase the method may continue to decrease the frictional-braking torque to satisfy the increase in driver torque demand by increasing the regenerative-braking torque at a controlled rate.

When the oncoming clutch is fully engaged, the offgoing clutch is fully disengaged, the frictional-braking torque to satisfy the increase in driver torque demand is fully replaced by the regenerative-braking torque, the torque phase may be ended initiating an end phase. The method may then satisfy any additional increase in driver torque demand by increasing a regenerative-braking torque once again.

A further aspect of this disclosure is directed to a method for providing a regenerative-braking torque limit on a transmission during a regenerative-braking downshift. The regenerative-braking downshift having sequential boost, start, torque, and inertia phases. This method includes operating the transmission in absence of a regenerative-braking torque limit during the boost and start phases. This method also includes operating the transmission with a regenerative-braking torque limit during the torque and inertia phases.

The method may provide frictional-braking to compensate for driver torque demand exceeding the regenerative-braking torque limit during the torque and inertia phases. The method may also include increasing the regenerative-braking torque limit towards the driver torque demand exceeding the regenerative-braking torque limit at a controller rate through the torque and inertia phases. As well, the method may include removing the regenerative-braking torque limit at the completion of the inertia phase.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
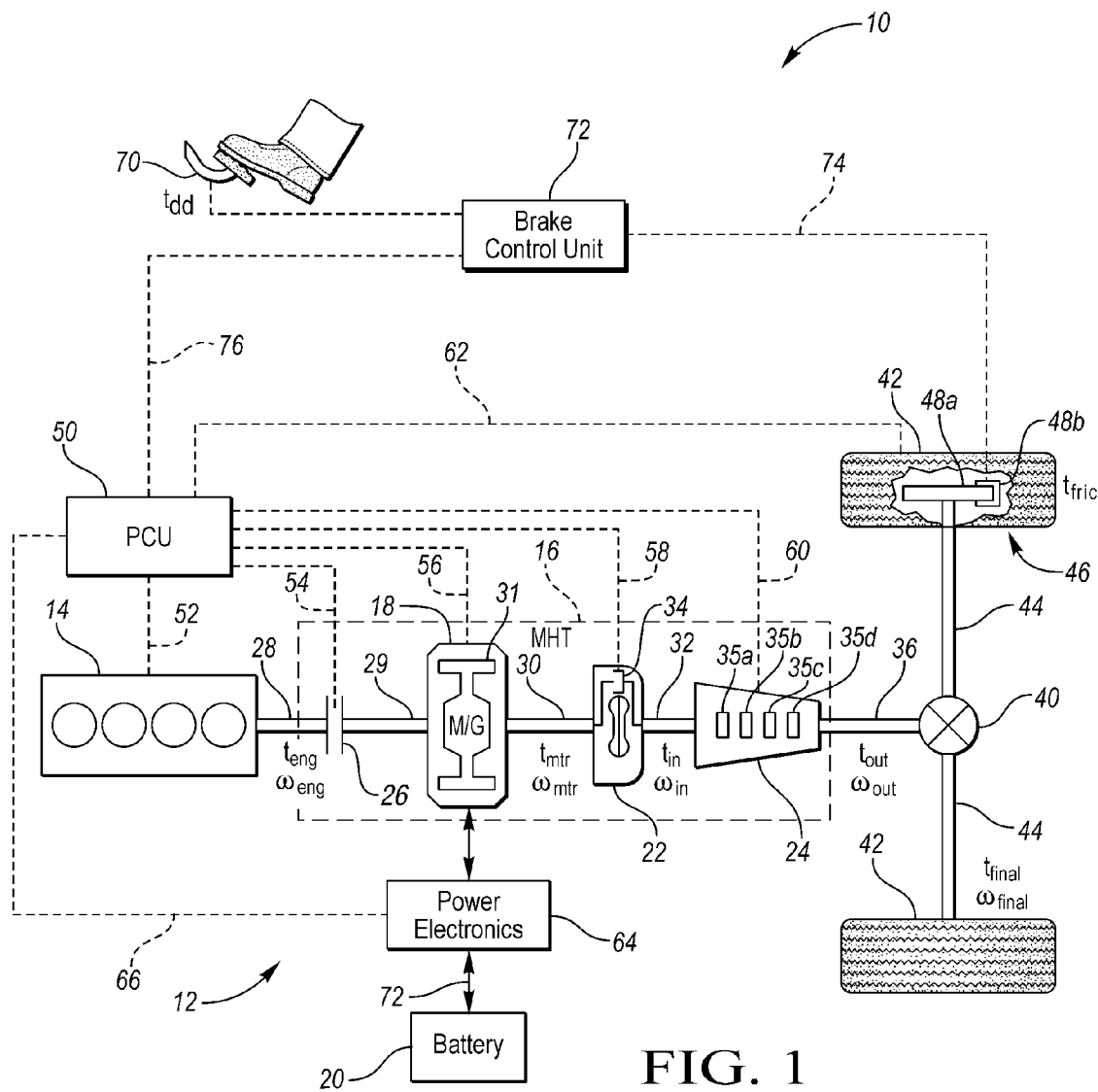
FIG. 1 is a diagrammatic illustration of a powertrain in a parallel hybrid vehicle.

FIG. 1 shows a schematic diagram of a hybrid electric vehicle (HEV) 10 and illustrates representative relationships among some of the components of the vehicle 10. Physical placement and orientation of the components within the vehicle 10 may vary. The vehicle 10 is shown as a traditional parallel hybrid powertrain 12, although others may be used. The powertrain 12 includes an engine 14 that drives a transmission system 16. Transmission system 16 includes an electric machine such as an electric motor/generator (M/G) 18, hereinafter simply referred to as a motor 18. Motor 18 is in electrical communication with a traction battery 20. Motor 18 is also coupled to a torque converter 22, and an automatic transmission 24. A disconnect clutch 26 may also be part of the transmission system 16, as shown here, or may be housed outside of the transmission system 16.

The engine 14 and the motor 18 are both drive sources for the vehicle 10. The engine 14 generally represents a power source that may include an internal combustion engine such as a gasoline, diesel, or natural gas powered engine. The engine 14 generates an engine power and corresponding engine torque, $t_{eng}$, that is supplied to the transmission system 16 when the disconnect clutch 26 between the engine 14 and the motor 18 is at least partially engaged. The engine 14 also has an engine speed, $\omega_{eng}$, when operating. The engine 14 may have a crankshaft 28, or engine output shaft 28, that provides the engine torque, $t_{eng}$, and the engine speed, $\omega_{eng}$, to the transmission system 16.

When the disconnect clutch 26 is at least partially engaged, power flow from the engine 14 to the motor 18 or from the motor 18 to the engine 14 is possible. For example, the disconnect clutch 26 may be engaged and motor 18 may operate as a generator to convert rotational energy provided by the engine output shaft 28 and a motor input shaft 29 into electrical energy to be stored in the battery 20. The disconnect clutch 26 may also be disengaged to isolate the engine 14 from the remainder of the powertrain 12 such that the motor 18 can act as the sole drive source for the vehicle 10. Motor input shaft 29 may extend through the motor 18 to a motor output shaft 30. The motor input shaft 29 and motor output shaft 30 may be a single unitary motor shaft 30. In this configuration, the motor 18 is continuously drivably connected to the shaft 30, whereas the engine 14 is drivably connected to the shaft 30 only when the disconnect clutch 26 is at least partially engaged.

The motor 18 may be implemented by any one of a plurality of types of electric machines. For example, motor 18 may be a permanent magnet synchronous motor. The motor 18 may have an impeller 31 connected to the motor shaft 30. The motor 18 generates a motor power and corresponding motor torque, $t_{mtr}$, for the transmission system 16. When the motor 18 consumes current provided by the battery 20 (discharging), motor torque, $t_{mtr}$, is supplied to the transmission system 16 as a positive torque or driving torque. When the motor 18 provides current to the battery 20 (charging), motor torque, $t_{mtr}$, is removed from the transmission system 16 and may be regarded as a negative torque or braking torque on the transmission system 16. The motor 18 may be used to provide current to the battery 20 by being powered by the engine 14, as discussed above, and by performing regenerative-braking for the vehicle 10, which will be discussed in greater detail below. The motor 18 has a speed, $\omega_{mtr}$, which may be obtained by measuring the speed of the impeller 31, speed of the motor shaft 30, or by measuring current flow in or out of the motor 18.

In any mode of operation, the motor 18 may provide a driving torque or a braking torque for the powertrain 12. The motor 18 may act as a generator and convert kinetic energy from the powertrain 12 into electric energy to be stored in the battery 20. The motor 18 may even act as a generator while the engine 14 is providing propulsion power for the vehicle 10, for example. The motor 18 may additionally act as a generator during times of regenerative-braking in which rotational energy from spinning wheels 42 is transferred back through the transmission 24 and is converted into electrical energy for storage in the battery 20. The motor 18 may provide regenerative-braking torque on the powertrain 12.

The motor 18 is connected to the torque converter 22 via shaft 30. The torque converter 22 includes an impeller fixed to motor shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque generally depends upon the relative speeds. When the ratio of impeller speed to turbine speed is sufficiently high, the turbine torque is a multiple of the impeller torque. The output of the torque converter 22 is the transmission input shaft 32 which transfers the transmission input torque, $t_{in}$, and has a transmission input speed, $\omega_{in}$. Torque converter 22 may also be included within the transmission 24, and the transmission input shaft 32 may be an internal transmission shaft 24.

A torque converter bypass clutch 34 (sometimes referred to as a lock-up clutch) may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the motor 18 and transmission 24 for applications that do not include a torque converter 22 or a torque converter bypass clutch 34. In some applications, disconnect clutch 26 is generally referred to as an upstream clutch and launch clutch (which may be a torque converter bypass clutch 34) is generally referred to as a downstream clutch.

The transmission 24 may be a step-ratio transmission 24 including discrete gear sets (not shown) that are selectively placed in different gear ratios by selective engagement of friction elements such as clutches and brakes 35a, 35b, 35c, 35d, hereinafter referred to simply as clutches 35a, 35b, 35c, 35d, to establish the desired multiple discrete or step drive ratios. The clutches 35a, 35b, 35c, 35d are controllable through a shift schedule that connects and disconnects certain elements of the gear sets to control the ratio between a transmission output shaft 36 and the transmission input shaft 32. For example, in a first gear ratio clutches 35a, 35b, and 35c may be engaged while 35d is not engaged, and in a second gear ratio clutches 35a, 35b, and 35d may be engaged while 35c is not engaged. To shift from the first gear to the second gear, clutch 35c must be disengaged while clutch 35d is engaged. Clutch 35c may be referred to as the offgoing clutch 35c, while clutch 35d may be referred to as the oncoming clutch 35d. Although only four friction elements are shown here, any number over three may be used.

The output shaft 36 is shown connected to a differential 40. The differential 40 drives a pair of wheels 42 via respective axles 44 connected to the differential 40. The differential may transmit approximately equal torque, $t_{final}$, and speed, $\omega_{final}$, to each wheel 42 when the vehicle 10 is tracking straight. The differential 40 permits torque and speed differences between the wheels 42, such as when the vehicle turns a corner. Different types of differentials or similar devices may be used to distribute torque from the powertrain to one or more wheels. In some applications, torque distribution may vary depending on the particular operating mode or condition. Although the differential 40, wheels 42, and axles 44 resemble that of a solid axle rear wheel drive configuration, the figure is merely representative, the wheels 42 may be independently suspended, axles 44 may be half shafts including constant velocity joints, and the wheels 42 may be from a front wheel drive configuration or from a four-wheel drive configuration.

Wheels 42 and/or axles 44 may have friction brakes/a frictional-braking system 46 which may be applied to reduce the torque, $t_{final}$, and speed, $\omega_{final}$, at the wheels 42. The friction brakes 46 shown here have a rotor 48a coupled to the axle 44 and a caliper 48b disposed around the rotor 48a and coupled to the vehicle 10, commonly referred to as a disk brake, such that when the caliper 48b is applied it squeezes the rotor 48a and the friction between the two reduced the torque $t_{final}$, and speed, $\omega_{final}$, at the wheels 42. Other friction brakes 46, such as, but not limited to, drum brakes may be used. The frictional-braking system 46 may be used to provide a frictional-braking torque on the powertrain 12.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC), an HEV energy management controller, and a transmission ratio manager controller, among others. It should therefore be understood that the PCU 50 and one or more other controllers can collectively be referred to as controller 50 that controls various actuators in response to signals from various sensors to control functions. For example, such as starting/stopping engine 14, operating motor 18 to consume current and provide wheel torque or produce current to charge battery 20, select or schedule transmission shifts, etc.

The controller 50 may communicate with various engine/vehicle sensors and actuators via an input/output (I/O) interface that may be implemented as a single integrated interface that provides various raw data, information, or signal conditioning, processing, and/or conversion, short-circuit protection, and the like. Alternatively, one or more dedicated hardware or firmware chips may be used to condition and process particular signals before being supplied to the CPU.

The controller 50 may send signals to and receive signals from the engine 14 via communication line 52, disconnect clutch 26 via communication line 54, motor 18 via communication line 56, launch clutch 34 and/or torque converter 22 via communication line 58, transmission 24 via communication line 60, drive wheels 42 via communication line 62, and other power electronics 64 via communication line 66, among others. Communication between the controller 50 and the components may be done through hard wire or wirelessly. Communication may not be direct and may go through other systems. For example, the controller may receive engine torque, $t_{eng}$, and engine speed, $\omega_{eng}$, directly from a crankshaft position or speed sensor (not shown) or engine torque transducer (not shown) via hard wired communication lines 52, or from a vehicle communication system such as a CAN Bus (not shown). Similarly, the powertrain 12 may have speed sensors and torque sensors located at each of the above mentioned components, such as a motor impeller speed sensor (not shown) and wheel speed sensors (not shown).

As well, although not explicitly illustrated, various additional functions or components that may be controlled by controller 50 such as fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative-braking, motor operation, clutch pressures for disconnect clutch 26, launch clutch 34, and a shift schedule for the transmission 24, and the like. Sensors communicating input through the I/O interface may be used to indicate turbocharger boost pressure, crankshaft position (PIP), engine rotational speed, wheel speeds, vehicle speed, coolant temperature, intake manifold pressure (MAP), accelerator pedal position, ignition switch position, throttle valve position, air temperature, exhaust gas oxygen, or other exhaust gas component concentration or presence, intake air flow, transmission gear, ratio, or mode, transmission oil temperature, torque converter turbine speed, torque converter bypass clutch 34 status, deceleration or shift mode, and motor speed, for example.

The vehicle 10 has a brake pedal 70 which is used by the driver of the vehicle 10 to provide a driver torque demand, $t_{dd}$, or braking command to decelerate the vehicle. In general, depressing and releasing the pedal 70 generates a brake pedal position signal that may be interpreted by a brake control unit 72 as a demand for decreased power or torque to pass through the transmission system 16 to decelerate the vehicle 10. Brake control unit 72 may stand alone as a separate component or system, as shown here, or may be incorporated in controller 50. Brake control unit 72 may include all of the same corresponding attributes associated with controller 50 as described above.

Based at least upon input from the brake pedal 70, the brake control unit 72 commands the friction brakes 46, the motor 18, $t_{mtr}$, and in some cases even the engine 14, $t_{eng}$, in varying combinations or each individually, to reduce torque passing through the transmission system 16 to decelerate the vehicle 10. The brake control unit 72 may communicate with the friction brake/frictional-braking system 46, as indicated by communication line 74, to reduce torque output at the wheel 42. The brake control unit 72 may also communicate with the controller 50, as indicated by communication line 76, to use the motor 18 to provide regenerative-braking, or the engine 14 to provide engine-braking to the transmission system 16. The brake control unit 72 may also communicate directly with the motor 18 and/or engine 14.

The controller 50, and/or brake control unit, may also be programmed to control the timing of gear shifts within the transmission 24. It may be desirable to downshift the transmission 24 during regenerative-braking. As mentioned above, downshifting the transmission 24 increases the speed of the motor 18, $\omega_{mtr}$, allowing for the motor 18 to provide a greater negative torque input, $t_{mtr}$, into the powertrain 12 and provide for an increase in battery 20 charging.

The driver depresses brake pedal 70 to brake the vehicle. Depressing of the brake pedal 70 provides a driver torque demand, $t_{dd}$, into the controller 50. The controller 50 initiates a regenerative-braking event by using the motor 18 to provide a negative torque, $t_{mtr}$, on the powertrain 12. A downshift of transmission 24 is typically requested when collecting regenerative-braking energy as the higher input speed of transmission 24 allows for greater regenerative braking power, usually at higher efficiencies. The standard shift schedule is typically modified during regenerative-braking to downshift sooner so that more power can be collected at a better efficiency. The input speed of transmission 24 is pushed higher when transmission 24 downshifts during regenerative-braking downshifting because of the speed ratio increase.

During a regenerative-braking downshift the initial pressure of the offgoing clutch is set at a value high enough to maintain current torque values in the transmission 24, but low enough to allow for effective exchange of engagement to the oncoming clutch. During this time period, the driver may increase the driver torque demand, $t_{dd}$, by further depressing brake pedal 70. If the increase in driver torque demand, $t_{dd}$, is provided by the motor 18 with no restriction or limit, the regenerative-braking torque, $t_{mtr}$, may be too much or occur too fast for either the offgoing clutch to hold at its current setting or the oncoming clutch to hold in its initial stages of engagement. If either the offgoing or oncoming clutch slips, the regenerative-braking motor torque, $t_{mtr}$, may cause the input shaft 32 to slow, or stop, in respect to the output shaft 36. If this occurs, when the oncoming clutch fully engages such that the input and output shafts 32, 36 will rotate relative each other, a jolt or vibration, sometimes referred to as a shift-shock, may be felt.

Figure 2A:
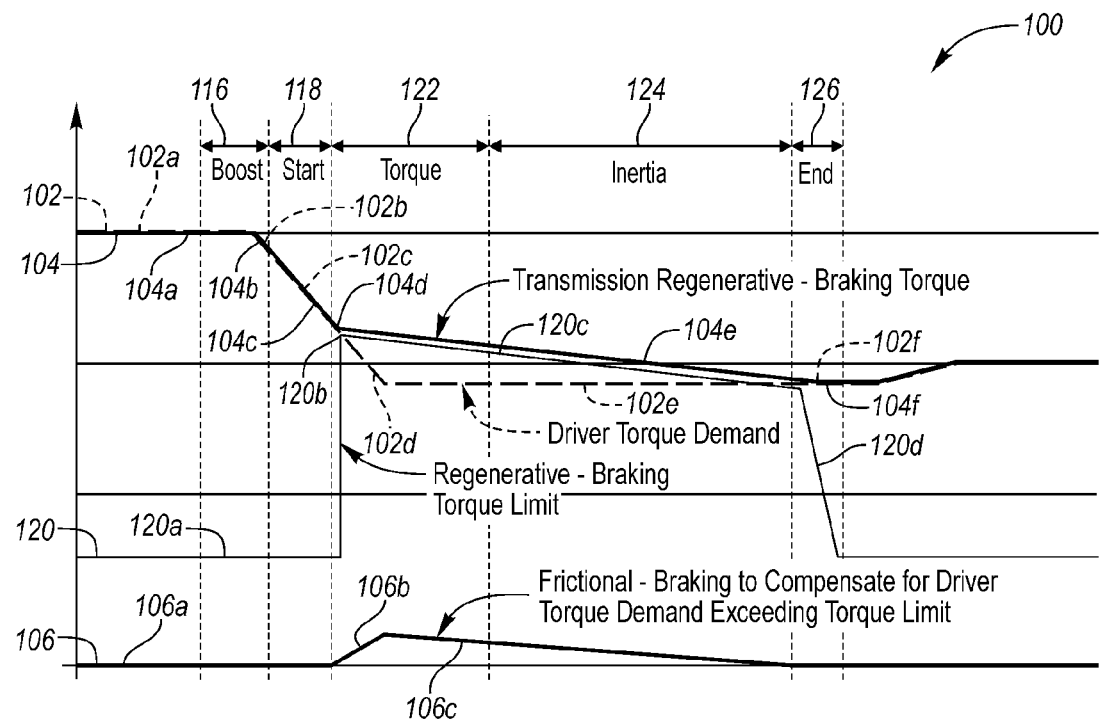
FIGS. 2a and 2b are graphs of a control strategy for maximizing torque transfer through the transmission during a regenerative-braking transmission downshift.
Figure 2B:
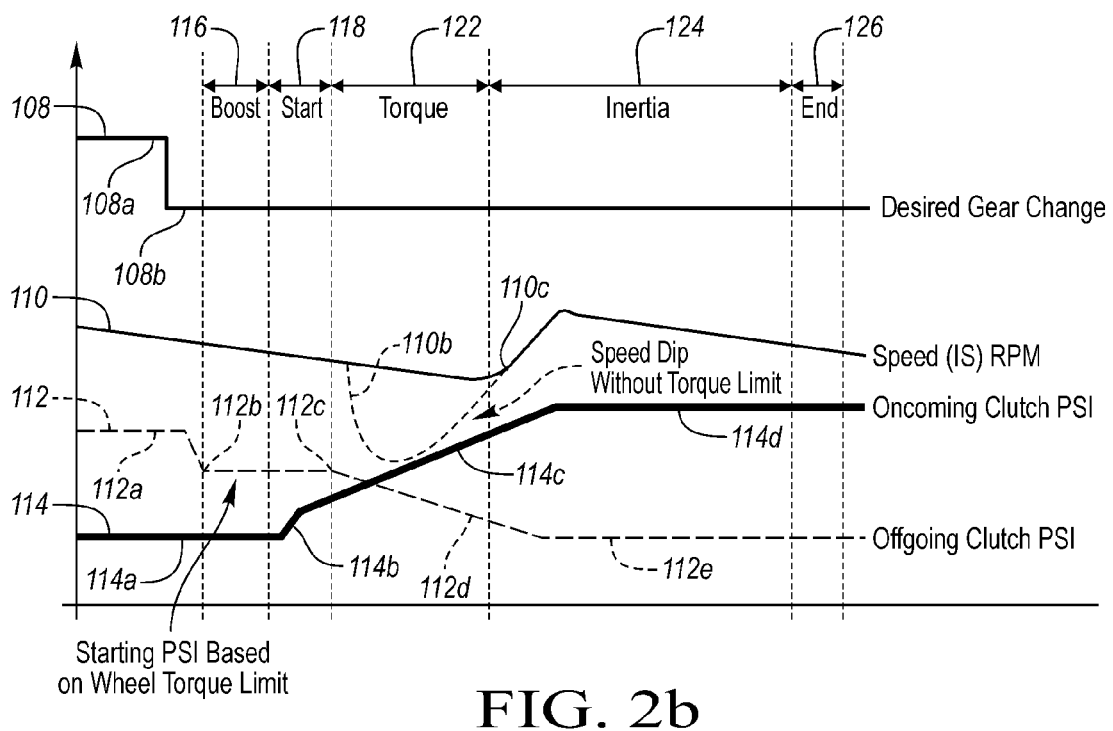

FIGS. 2a and 2b show a control strategy 100 for preventing the speeds of the input or output shafts $\omega_{in}$, $\omega_{out}$ (see FIG. 1) from experiencing shift-shock while at the same time improving regenerative-braking energy recapture. In general, the regenerative-braking torque 104 is limited at a specific time in the regenerative-braking downshift event to thereby prevent transmission input speed dipping effects. In each of FIGS. 2a and 2b, an exemplary regenerative-braking downshift is shown with plots of varying elements, potential actions/reactions, and actual actions/reactions over X-axes representing time. FIG. 2a showcases more of the control strategy 100 and FIG. 2b showcases more of the physical changes occurring within the transmission. The control strategy 100 may run in series with an existing transmission downshifting control methodology or the control strategy 100 may incorporate both.

A regenerative-braking downshift event is initiated at the outset by a driver providing a driver torque demand, $t_{dd}$, on the vehicle in the form of a braking request. The driver torque demand, $t_{dd}$, is represented by plot line 102. Driver torque demand 102 is satisfied by a combination of regenerative-braking torque, as represented by plot line 104, and frictional-braking torque, $t_{fric}$, as represented by plot line 106. An initial driver torque demand 102a may be satisfied in whole, or part, by a preliminary regenerative-braking torque 104a. If all of the driver torque demand 102a is satisfied by the regenerative-braking torque 104a then plot lines 102 and 104 lie on top of each other, as shown here. If this occurs, then a preliminary frictional-braking torque 106a may be set at zero. If only a portion of the driver torque demand is satisfied by the regenerative-braking torque, then the plot lines 102 and 104 will diverge from each other, and the frictional-braking plot line 106 will also diverge from its present path equal in magnitude to the divergence of 104 from 102.

Actual measured driver torque demand, regenerative-braking torque and frictional braking torque from a vehicle may have slight exchanges, variations and noise in their respective actual plots, but for illustrative purposes torques are all shown here as substantially straight and constant lines. A reference to an 'increase' in a torque, or 'additional' torque, may be understood to be an increase in the absolute value of the torque as the torque increase may actually be a negative torque increase request into the system. For example, when a driver further depresses a brake pedal to increase the deceleration of the vehicle, this may be referred to as an increase in driver torque demand, but is represented by the driver torque demand line 102 lowering on the chart. Same with the regenerative-braking torque line, a tracing of the line in a downward direction is an increase in negative torque to the system. The frictional-braking torque line, on the other hand, shows a rising of the line to indicate an increase in torque to the system.

A desired gear change is represented by a plot line 108, in which the higher gear is 108a and the desired lower gear is 108b. Although the desired gear change line 108 shows movement from a representative higher gear 108a to a lower gear 108b in its step at the upper left of FIG. 2b, an actual exchange of speed through the transmission, and thus and actual shift, does not occur until later, as seen by following the input shaft speed line 110.

The desired gear change transition from 108*a* to 108*b* represents a prompt to initiate the regenerative-braking downshift event. In order to downshift a transmission, one shift element must disengage, referred to as the offgoing clutch, the engagement of which is represented by plot line 112, while another clutch must engage, referred to as an oncoming clutch, the engagement of which is represented by plot line 114. At the onset of the regenerative-braking downshift event, the offgoing clutch is fully engaged at the engagement level 112*a* corresponding with the transmission being in the higher gear 108*a*. To effect an efficient regenerative-braking downshift, the offgoing clutch is set at an engagement level sufficient enough to hold the current regenerative-braking torque demand, while also being insufficient enough to allow for a smooth transition of power transfer through the transmission by the oncoming clutch, as represented at 112*b*. The clutch engagements are represented as pressures and illustrated in pounds per square inch (PSI), however any metric for pressure or engagement force may be used.

In general, for any transmission gear shift, a smooth transition between the offgoing and oncoming clutches is desired. A transmission could immediately and fully disengage the offgoing clutch followed by a smooth ramp up of the oncoming clutch for a transition. However, the disengagement of the offgoing clutch would prevent any possibility of energy recapture by the motor until the oncoming clutch engages. As well, this abrupt exchange of shift elements may cause other noise, vibration and harshness (NVH) concerns.

Setting the offgoing clutch at a maximum engagement setting would ensure that all of the regenerative braking could transfer through the transmission until the oncoming clutch becomes fully engaged, but a maximum engagement of the offgoing clutch until maximum engagement of the oncoming clutch could result in transmission lock-ups, excessive wear on the shift-elements and other potential NVH concerns. Thus a balance to achieve the optimal energy recapture while providing for the smoothest shift is desired.

The offgoing clutch is set at an engagement/pressure level 112*b* that corresponds with a value that will hold the current torque passing through the transmission without concern of slipping. The new engagement level 112*b* of the offgoing clutch may be based on a wheel torque limit. The wheel torque limit may be published and available from other vehicle control systems or a vehicle communication system. The wheel torque limit may be the minimum amount of wheel end torque (which corresponds to the maximum amount of regenerative-braking torque) that is allowed by the brake controls system based on vehicle sensors that the brake controls systems has available (i.e. wheel slip, yaw). When vehicle sensors indicate vehicle stability conditions are degrading, the brake controls system would raise the braking stability wheel torque limit, minimizing regenerative-braking torque to maintain vehicle stability. This allows the brake controls system to build brake hydraulic pressure so that it can control individual wheel slip during stability control or antilock braking.

The regenerative-braking downshift event may be divided into a number of sequential phases as defined by actions occurring during the event. The setting of an offgoing clutch engagement 112*b* to a level sufficient enough to hold an initial driver torque demand initiates a boost phase 116 of the regenerative-braking event.

An oncoming clutch will exchange engagement with the offgoing clutch, as indicated by plot lines 112 and 114, in order to effect a transmission downshift. The oncoming clutch will have substantially no engagement at the onset of the downshift and into and through the boost phase 116, as indicated at 114*a*, however, the oncoming clutch may be boosted to fill its friction element actuator quickly in the boost phase 116 while the offgoing clutch has its pressure set to a value sufficient to hold input torque. Although the lines on the graph are labeled with PSI, and the oncoming clutch shows no increase in PSI at 114*a*, this is somewhat a misnomer, as the oncoming clutch is boosted in the boost phase, the pressure will increase, however not to a level of causing significant engagement. Additional driver torque demand 102*b* in the boost phase 116 may be satisfied by additional regenerative-braking torque as indicated at 104*b*, without need for additional frictional-braking torque, as indicated at 106*a*.

As well, although the offgoing clutch engagement during the boost phase is shown substantially constant at 112*b*, and the line is labeled with PSI units, that does not mean that the offgoing clutch may not increase in pressure during the boost phase 116. On the contrary, if additional driver torque demand is requested in the boost phase to a level that exceeds the engagement capability of the offgoing clutch, the pressure in the offgoing clutch may be increased to maintain the engagement. Maintaining the engagement of the offgoing clutch in the boost phase 116 provides for the maximum amount of regenerative energy recapture. The system may monitor for changes in the wheel torque limit during the boost phase 116 and change the pressure in the offgoing clutch accordingly to maintain a substantially constant engagement.

A start phase 118 is initiated, ending the boost phase 116, by the stroking of the oncoming clutch and initial increase in engagement, as indicated at 114*b*. The offgoing clutch engagement is maintained at substantially the same level 112*b* during the start phase 118. With this control strategy 100, additional driver torque demand 102*c* in the start phase 118 may also be satisfied by additional regenerative-braking torque 104*c*. Setting the boost and start phase offgoing clutch pressure to a value 112*b* based on the wheel torque limit at least partially allows for no regenerative-braking torque limit, as indicated by plot line 120, to be implemented in the boost and start phases 116, 118. This allows for more regenerative-braking energy recovery to occur in these two phases. Said another way, the transmission is operated in absence of a regenerative-braking torque limit, as indicated at 120*a*, during the boost and start phases 116, 118.

A torque phase 122 is initiated, ending the start phase 118, by the controlled and ramped disengagement of the offgoing clutch, as shown at 112*c*. The control strategy 100 places a regenerative-braking torque limit 120*b* on the regenerative-braking available from the motor. The regenerative-braking limit 120*b* may be set at the regenerative-braking torque level 104*d* that existed at the initiation of the torque phase 122. Additional driver torque demand 102*d* in the torque phase 122 may then be satisfied by frictional-braking torque 106*b*. Note that the divergence of the regenerative-braking torque line 104 from the driver torque demand line 102 is of a substantially similar magnitude of the divergence of the frictional-braking torque line 106 to compensate for the regenerative braking not being allowed by the regenerative-braking torque limit 120 to satisfy the driver torque demand 102. By doing this, the speed line 110 maintains a smooth consistent curve through the torque phase 122 as opposed to experiencing a speed dip, as shown by dashed line 110b, that may occur without the regenerative-braking torque limit 120b of this control strategy.

In the torque phase 122, the offgoing clutch follows a controlled and smooth disengagement line, as indicated by 112d, and the oncoming clutch follows a controlled and smooth engagement line, as indicated by 114c, wherein the engagement level of the oncoming clutch surpasses the engagement of the offgoing clutch. Increasing engagement of the oncoming clutch allows for more regenerative-braking torque to be transmitted through the transmission. Thus the control strategy 100 steadily and smoothly begins to lower the regenerative-braking torque limit, as indicated by 120b, allowing the regenerative-braking torque to increase, as indicated at 104e, and the frictional-braking torque to lessen equal in magnitude, as indicated by 106c.

The input shaft speed 110 increases as the oncoming clutch becomes more engaged, as indicated by 110c, initiating an inertia phase 124 and ending the torque phase 122. The regenerative-braking torque limit 120 remains in effect in the inertia phase 124. The regenerative-braking torque limit may continue to steadily and smoothly lower, as further indicated by 120c, to diverge upon the driver torque demand 102e. During this time, the frictional-braking torque 106 continues to decrease in magnitude equal to the increase in regenerative-braking torque 104 towards the driver torque demand 102. Also in this time period, the oncoming clutch becomes fully engaged, as indicated by 114d, and the offgoing clutch becomes fully disengaged, as indicated by 112e.

The inertia phase 124 is ended by the regenerative-braking torque 104 satisfying a desired portion of the driver torque demand 102, initiating an end phase 126. The end phase 126 may also be initiated by the full engagement of the oncoming clutch or full disengagement of the offgoing clutch. The regenerative-braking torque limit is removed from the transmission, as indicated by 120d, in the end phase 126. This allows the regenerative-braking torque to once again satisfy all or a portion of the driver torque demand, as indicated by lines 102f and 104f. Said another way, the transmission is operated with a regenerative-braking torque limit 120 during the torque and inertia phases 122, 124, which ends at the end phase 126.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle powertrain comprising:
    an electric machine for providing a regenerative-braking torque on the powertrain;
    a frictional-braking system for providing a frictional-braking torque on the powertrain;
    a transmission coupled to the powertrain for providing a regenerative-braking downshift to increase an amount of energy recapture during the regenerative-braking by exchanging engagement of an offgoing clutch and an oncoming clutch over a series of phases; and
    a controller in communication with the electric machine, frictional-braking system and transmission and programmed to, in response to an increase in driver braking torque demand during the regenerative-braking downshift, satisfy the increase in driver braking torque demand with regenerative-braking torque prior to the offgoing clutch disengaging and with frictional-braking torque after the offgoing clutch begins disengaging.

2. The powertrain of claim 1 wherein the controller is further programmed to steadily increase the regenerative-braking torque, while reducing the frictional-braking torque, to satisfy the increase in driver braking torque demand during the regenerative-braking downshift as the oncoming clutch increases in engagement.

3. The powertrain of claim 1 wherein the controller, at an onset of the regenerative-braking downshift, is further programmed to set the offgoing clutch at an initial engagement, based on a wheel torque limit, initiating a boost phase.

4. The powertrain of claim 3 wherein the controller is further programmed to maintain the offgoing clutch at a substantially constant engagement throughout the boost phase.

5. The powertrain of claim 3 wherein the controller is further programmed to hinder engagement of the oncoming clutch throughout the boost phase.

6. The powertrain of claim 3 wherein the controller is further programmed to stroke the oncoming clutch while hindering disengagement of the offgoing clutch defining a start phase.

7. The powertrain of claim 6 wherein the controller is further programmed to increase engagement of the oncoming clutch while hindering disengagement of the offgoing clutch throughout the start phase.

8. The powertrain of claim 7 wherein the controller is further programmed to begin decreasing the engagement of the offgoing clutch, initiating a torque phase, while continuing to increase the engagement of the oncoming clutch.

9. The powertrain of claim 8 wherein a rotational speed of the powertrain increases, due to the exchanging of engagement of the offgoing clutch with the oncoming clutch, initiating an inertia phase.

10. The powertrain of claim 9 wherein the oncoming clutch becomes fully engaged, the offgoing clutch becomes fully disengaged, and the controller is further programmed to satisfy the increase in driver braking torque demand solely with regenerative-braking torque once again.

11. A regenerative-braking downshift method comprising:
    setting an offgoing clutch engagement to hold a driver torque demand initiating a boost phase;
    stroking and engaging an oncoming clutch initiating a start phase;
    satisfying an increase in driver torque demand, during the boost and start phases, by increasing a regenerative-braking torque;
    disengaging an offgoing clutch initiating a torque phase; and
    satisfying an increase in driver torque demand, during the torque phase, by increasing a frictional-braking torque.

12. The method of claim 11 wherein a level of engagement of the offgoing clutch sufficient to hold a driver torque demand is based on a wheel torque limit.

13. The method of claim 11 further comprising:
    decreasing the frictional-braking torque to satisfy the increase on driver torque demand during the torque phase by increasing the regenerative-braking torque at a controlled rate.

14. The method of claim 13 wherein a rotational speed of the powertrain increases, due to the exchanging of engagement of the offgoing clutch with the oncoming clutch, initiating an inertia phase and further comprising:

continuing to decrease the frictional-braking torque to satisfy the increase in driver torque demand during the inertia phase by increasing the regenerative-braking torque at a controlled rate.

15. The method of claim 14 wherein the oncoming clutch is fully engaged, the offgoing clutch is fully disengaged, the frictional-braking torque to satisfy the increase in driver torque demand is fully replaced by the regenerative-braking torque, initiating an end phase, and further comprising:

satisfying an increase in driver torque demand, during the end phase, by increasing a regenerative-braking torque.

16. A method of downshifting a transmission comprising:

providing a regenerative braking downshift to increase energy recaptured during regenerative braking by exchanging engagement of an offgoing clutch and an oncoming clutch over phases;

in response to an increase in driver braking torque demand during the regenerative braking downshift, satisfying the increase with regenerative braking torque prior to an offgoing clutch disengaging, and satisfying the increase with frictional braking torque after the offgoing clutch begins disengaging.

\* \* \* \* \*